United States Patent [19]

Ito

[11] Patent Number: 5,592,534
[45] Date of Patent: Jan. 7, 1997

[54] RADIO COMMUNICATION SYSTEM HAVING A BASE UNIT CONTROL FOR ESTABLISHING WIRE-LINE CONNECTIONS FOR CALLS FROM MOBILE UNITS AND FOR DISPLAYING ANY WAIT STATUS FOR SUCH CALLS

[75] Inventor: Koichi Ito, Hino, Japan

[73] Assignee: Kabushiki Kaisha Toshiba, Kawasaki, Japan

[21] Appl. No.: 461,757

[22] Filed: Jun. 5, 1995

Related U.S. Application Data

[63] Continuation of Ser. No. 150,256, Nov. 10, 1993, abandoned, which is a continuation of Ser. No. 480,137, Feb. 14, 1990, abandoned.

[30] Foreign Application Priority Data

Feb. 17, 1989 [JP] Japan .................................... 1-37787

[51] Int. Cl.$^6$ .................................................. H04Q 7/38
[52] U.S. Cl. .................................................. 379/158; 379/61
[58] Field of Search .............................................. 379/58–63

[56] References Cited

U.S. PATENT DOCUMENTS

| | | | |
|---|---|---|---|
| 4,737,978 | 4/1988 | Burke et al. | 379/60 |
| 4,768,218 | 8/1988 | Yorita | 379/63 |
| 4,833,702 | 5/1989 | Shitara et al. | 379/60 |
| 4,878,238 | 10/1989 | Rash et al. | 379/62 |
| 4,884,294 | 11/1989 | Inagami | 379/61 |
| 4,953,198 | 8/1990 | Daly et al. | 379/61 |
| 4,977,589 | 12/1990 | Johnson et al. | 379/58 |

*Primary Examiner*—Dwayne D. Bost
*Attorney, Agent, or Firm*—Finnegan, Henderson, Farabow, Garrett & Dunner, L.L.P.

[57] ABSTRACT

A radio telephone system which includes a plurality of stationary base units connected to wire lines, a plurality of portable or mobile units to be coupled through spatial radio circuits to the plurality of base units, and a method of controlling the system. In the radio telephone system, users of the respective mobile units can know the busy states of the associated wire lines. When the base unit cannot accept a calling request issued from the associated mobile unit due to the busy state of the base unit, the base unit transmits to the mobile unit a data indicative of the busy state of the associated wire line to display an indication that the base unit is busy at the mobile unit.

11 Claims, 11 Drawing Sheets

RADIO COMMUNICATION SYSTEM HAVING A BASE UNIT CONTROL FOR ESTABLISHING WIRE-LINE CONNECTIONS FOR CALLS FROM MOBILE UNITS AND FOR DISPLAYING ANY WAIT STATUS FOR SUCH CALLS

This application is a continuation of application Ser. No. 08/150,256, filed Nov. 10, 1993, now abandoned which is a continuation of Ser. No. 07/480,137, filed Feb. 14, 1990, now abandoned.

BACKGROUND OF THE INVENTION

1. Field of the Invention

The present invention relates to a radio communication system including a plurality of portable or mobile units and a plurality of stationary base units which are connected to wire lines so as to be coupled through spatial radio circuits to the plurality of base units, and a method of controlling the system. More particularly, the present invention relates to a radio communication system in which each of a plurality of mobile units can know the busy state of an associated wire line, and a method of controlling the system.

2. Description of the Related Art

There has been so far demanded such a radio telephone system of public type that a plurality of stationary base units connected to wire lines are disposed at different locations and a plurality of portable or mobile units are provided in the service area of associated one of the plurality of base unit so that the plural mobile units can commonly use the wire line connected to the associated base unit. For the easy understanding of the public type radio telephone system, explanation will be made as to a prior art car telephone system which is considered to be similar to the public radio telephone system. The prior art car telephone system is configured as shown in FIG. 11, in which a public telephone network (PSTN) 101 is connected with a control station 102 which in turn is connected through a group of wire lanes 103a, 103b and 103c to base stations 104a, 104b and 104c respectively. The base stations 104a to 104c have respective service areas 105a to 105c which cover mobile stations 106a to 106e to allow these mobile stations to perform communication with the parties. For example, the mobile station 106a located within the service area 105a is connected through a spatial radio circuit, base station 104a, wire line 103a and then control station 102 to the public telephone network 101, whereby a communication line between the mobile station 105a and the party established. It is assumed in the system of FIG. 11 that the mobile station 106a moves at a high speed, the service areas 105a to 105c of the base stations 104a to 104c are set to have respectively a wide range corresponding to a circule area of a radius 10 km, and the system is arranged so that, when the mobile station 106a moves out of the service area 105a into the service area 105b, this causes switching of the system to its communication state based on the base station 104a from a communication state based on the base station 104b. Further, though the wire lines 103a to 103c have been illustrated only three in FIG. 11, an increased number of wire lines are provided so that the service areas 104a to 105c can cover many mobile stations, that is, so that the many mobile stations can be assigned to the associated wire lines. The car telephone system is essentially different in the following respects from the public type radio telephone system which is included in the present invention.

That is, the public type radio telephone system of the present invention requires three conditions (1) to (3) as follows.

(1) The movement distance of the user (mobile station) should be as short as possible.
(2) For the purpose of realizing the use of a small battery as the power source of the mobile unit, the power consumption (in particular, power consumption for signal transmission) of the unit should be small.
(3) In order to avoid radio interference between adjacent service areas, the signal transmission power of the mobile unit should be small.

For satisfying these conditions, it is desirable to reduce the service area, e.g., down to a circle area of radius 200 m. However, in the reduced service the area, possibility that many mobile units communicate with their parties at the same time is very small. Thus, it is uneconomical to assign a single base unit to a multiplicity of wire lines. For this reason, for example, one wire line is assigned to one base unit. In this case, while one mobile unit in the service area of the associated base unit is talking with the party, another mobile unit in the same service area cannot be used until the talk of the mobile unit in use is finished. This is similar to the situation where users are standing in front of a wired public telephone set in a queue awaiting their turn to use it. However, the public type radio telephone system of the present invention is different from the wired public telephone set in that the waiting users do not await their turn in a queue in front of the wired public telephone set but await the completion of the talk of the user in use at any location in the same service area. For this reason, the users have to await the completion of the talk of the user in question, without knowing how many other users are waiting and when the wire line becomes unoccupied.

In this way, the public type radio communication system has had such a problem that, in the event where a user wants to use his mobile unit but cannot use it due to the fact that the associated base unit is occupied by another mobile unit user, the user has to await the completion of the talk of another user without knowing the busy state of the base unit.

SUMMARY OF THE INVENTION

It is an object of the present invention to provide a public type radio communication system in which users of mobile units can know the busy state of associated one of base units.

The above object is attained by providing a radio communication system which comprises a base unit connected to at least one wire line and a plurality of mobile units to be coupled through spatial radio circuits to the base unit, the base unit controlling interconnections between the plurality of mobile units and the wire line, and which is characterized by further comprising, when the base unit cannot accept a calling request from one of the mobile units because the associated wire line is now in use, means for sending a data indicative of the busy state of the base unit from the base unit to the caller mobile unit and means for indicating the busy state corresponding to the received data on the mobile unit.

In accordance with the present invention, since the busy state of the associated base unit, i.e., the associated wire line can be displayed on the mobile unit, the user of the mobile unit can know the busy state of the associated base unit.

DESCRIPTION OF THE PREFERRED EMBODIMENTS

Embodiments of the present invention will be detailed by referring to the attached drawings.

Referring first to FIGS. 1 to 4, there is shown a schematic arrangement of a radio communication system in accordance with an embodiment of the present invention, in which a public telephone network (PSTN) 1 is connected through wire lines 2a to 2e with base units 3a to 3e respectively. These base units 3a to 3e have respective nonoverlapping service areas 4a to 4e each corresponding to a circle area having as a relatively small radius as, for example, about 200 m. Portable or mobile units 5a to 5i are located in these service areas 4a to 4e to talk with their parties.

Figure 1:
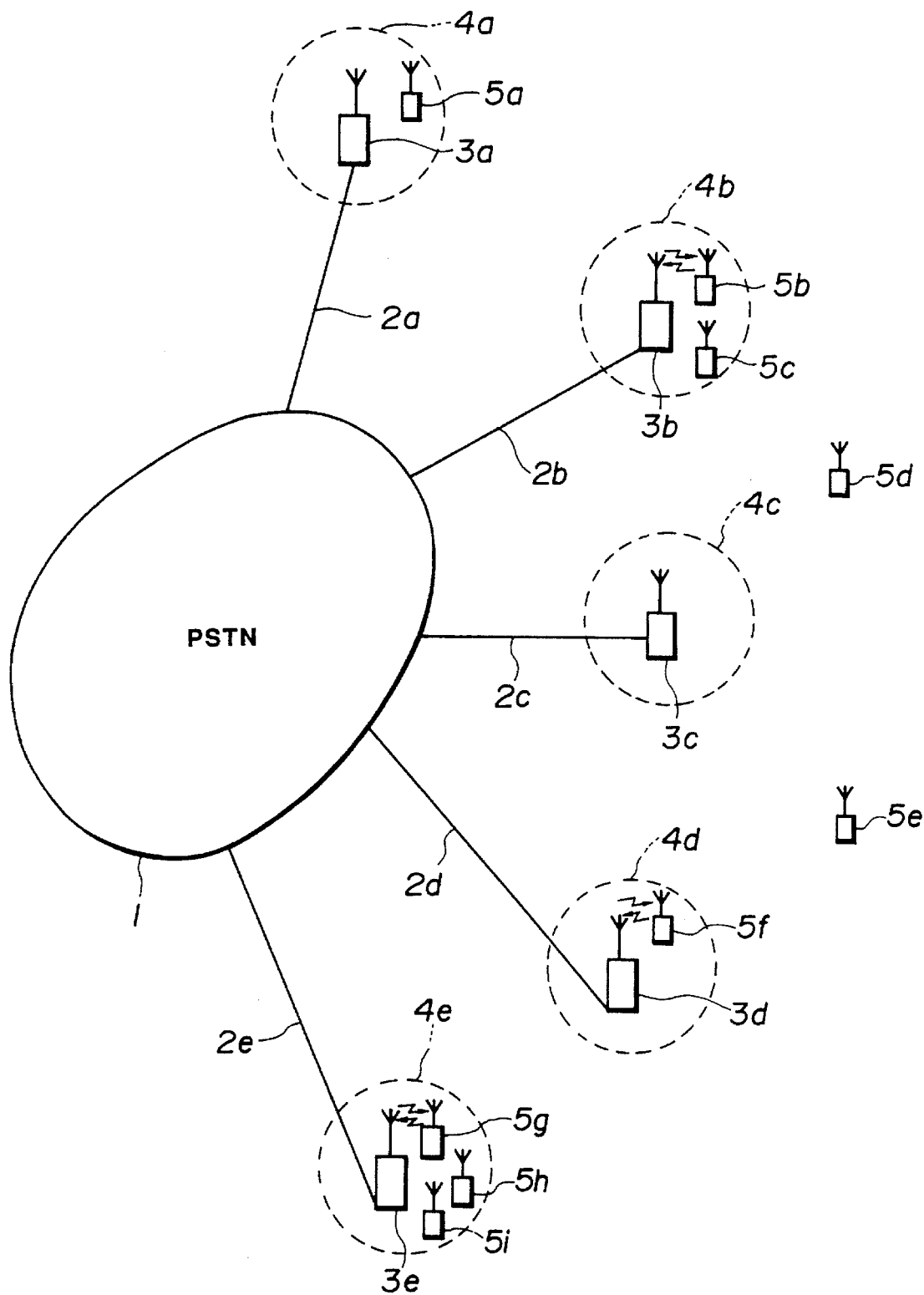
FIG. 1 schematically shows an arrangement of a radio communication system in accordance with a first embodiment of the present invention.
Figure 2:
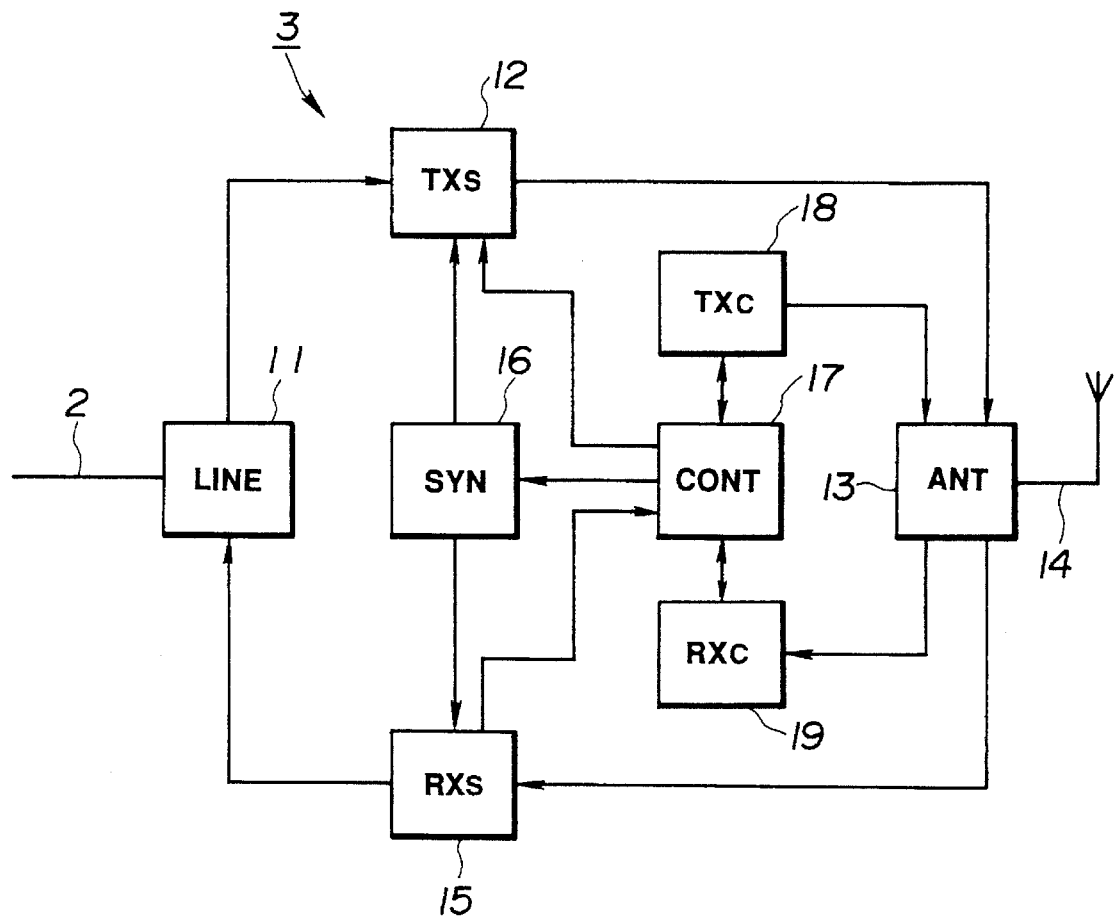
FIG. 2 is a block diagram of a base unit used in the embodiment of FIG. 1.

The detailed arrangement of the base unit 3 (corresponding representative one of the base units 3a to 3e) is shown in FIG. 2 in which a wired line interface 11 is connected with the wire line 2 (corresponding to representative one of the wire lines 2a to 2e). A voice signal sent through the wire line 2 into the wired line interface 11 of the base unit 3 is further applied from the interface 11 to a speech channel transmitter 12 as its modulation input. A modulated output of the transmitter 12 is sent through a multiplexer/distributer 13 to an antenna 14 to be transmitted therefrom. An input received at the antenna 14, on the other hand, is supplied through the multiplexer/distributer 13 to a speech channel receiver 15 to be demodulated thereat. A demodulated output of the receiver 15 is sent through the wired line interface 11 onto the wire line 2. A synthesizer 16, when receiving from a controller 17 a signal indicative of predetermined one of a plurality of speech channels designated by the controller 17, applies a signal indicative of the designated speech channel to the transmitter 12 and receiver 15. This causes the speech channel transmitter and receiver 12 and 15 to be operated on the speech channel designated by the controller 17, whereby radio communication of the voice signal is carried out on the designated speech channel. Each of the base units 3a to 3e in FIG. 1 selects idle one of the plurality of speech channels and transmits and receives voice signals on the selected speech channel.

Meanwhile, a control channel transmitter 18, when receiving a control signal from the controller 17, sends, on the control channel, the received control signal through the multiplexer/distributer 13 to the antenna 14 to be transmitted therefrom. A control channel receiver 19a receives and demodulates a received input of the control channel sent from the antenna 14 through the multiplexer/distributer 13 and sends its demodulated output to the controller 17 as a control signal.

Figure 3:
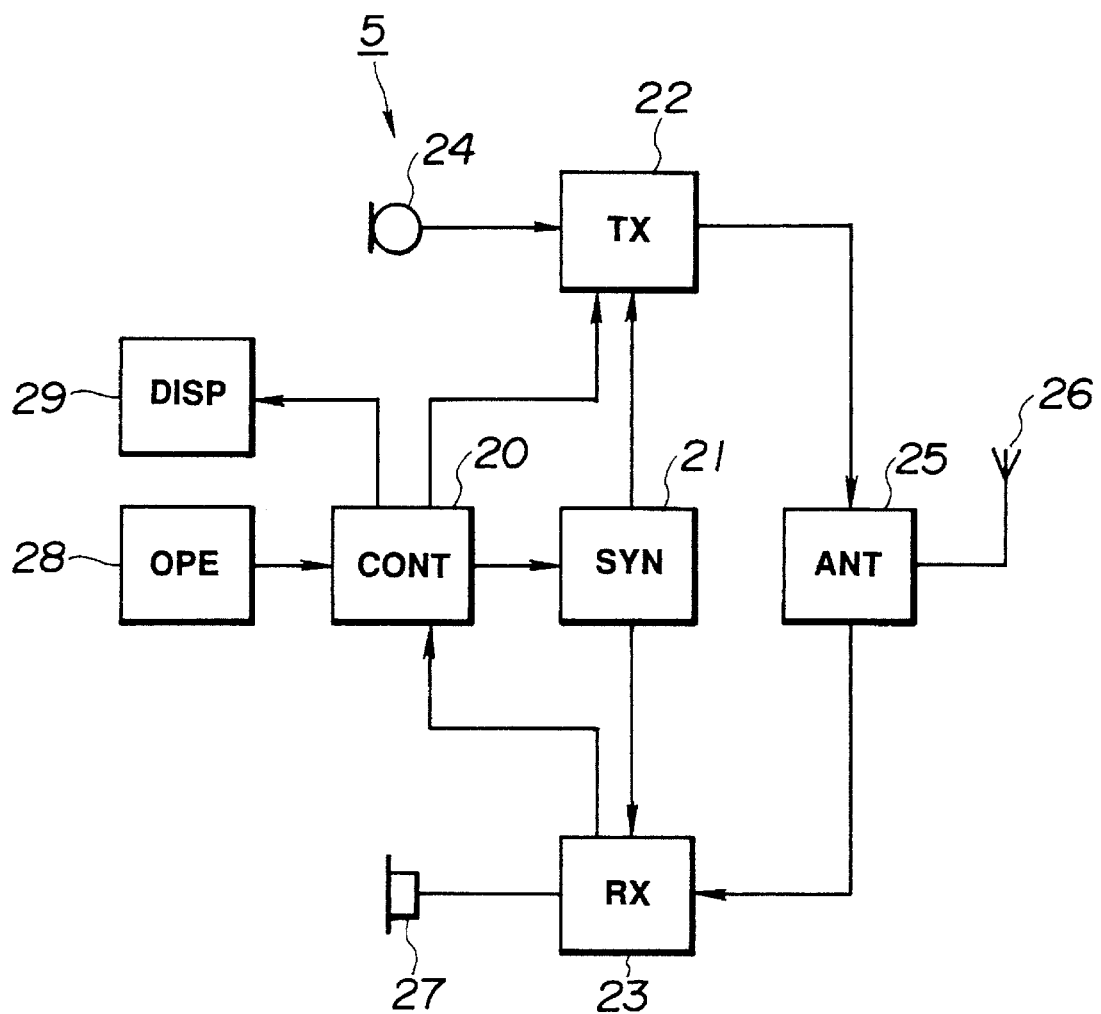
FIG. 3 is a block diagram of a mobile unit used in the embodiment of FIG. 1.

Shown in FIG. 3 is an detailed arrangement of the mobile unit 5 (corresponding to representative one of the mobile units 5a to 5i), wherein a controller 20 designates any one of the plurality of speech channels and control channel and sends a signal indicative of the designated channel to a synthesizer 21. The synthesizer 21, when receiving the signal indicative of the designated channel from the controller 20, applies a signal corresponding to the designated channel to a transmitter 22 and a receiver 23. This causes the transmitter 22 and receiver 93 to be operated on the designated channel. When the transmitter and receiver 22 and 23 are operated on one of the speech channels for example, the transmitter 22 receives a voice signal from a handset transmitter 24 and sends it on the designated speech channel through a multiplexer/distributer 25 to an antenna 26 so that the voice signal is transmitted from the antenna 26, while the receiver 23 receives a voice signal on the designated speech channel from the antenna 26 through the multiplexer/distributer 25 and applies it to a handset receiver 27. When the transmitter and receiver 22 and 23 are operated on the control channel, on the other hand, the transmitter 22 receives the control signal from the controller 20 and sends it on the control channel through the multiplexer/distributer 25 to the antenna 26 so that the control signal is transmitted from the antenna 26, whereas the receiver 23 receives a control signal on the control channel from the antenna 26 through the multiplexer/distributer 25 and applies it to the controller 20. The controller 20 in turn generally controls the mobile unit in question and also controls a display 29 to display various data on the display 29, in response to an operational input received from an operating part 28.

In this way, transfer of the voice signal and control signal between the base and mobile units 3 and 5 is carried out on the speech and control channels to thereby realize a communication on a multi-channel access basis.

The detailed operation of the radio communication system a call is transmitted from the mobile unit 5 to the associated base unit will be explained in accorance with a flowchart of FIG. 4.

First of all, when the user of the mobile unit 5 operates the operating part 28 to put the mobile unit in its off-hook state, that is, transmission state (step 30), this causes the controller 20 to set the transmitter 22 and the receiver 23 at the control channel and apply a transmission signal including the identification code of the mobile unit 5 to the transmitter 22. The transmitter 22 in turn supplies the received transmission signal of the control channel through the multiplexer/distributor 25 to the antenna 26 to transmit it therefrom (step 31).

The base unit 3, meanwhile, receives the transmission signal at the antennas 14 and then sends it therefrom through the multiplexer/distributor 13 to the control channel receiver 19 which in turn applies the received transmission signal to the controller 17. The controller 17, when receiving the transmission signal (step 32), identifies the identification code of the mobile unit included in the transmission signal and determines that the signal was issued from the mobile unit in question. At this time, the controller 17 judges whether or not a count value n at a count address in a memory (not shown) incorporated in the controller 17 is 0

(step 33). If the base unit 3 is not used for speech, then the count value n is 0, in which case the controller 17 applies to the control channel transmitter 18 a speech channel designation signal indicative of the speech channel allocated to the base unit 3. The speech channel designation signal, which includes the identification code indicated by the aforementioned transmission signal, is transmitted from the antenna 14 (step 34). Thereafter, the controller 17 sets the count value n at 1 and also turns ON the voice transmitter 12 and the speech channel receiver 15 to get ready for a speech (steps 35 and 36). At this time, a DC loop of the wire line 2 connected to the base unit 3 is closed.

In the mobile unit 5, the aforementioned speech channel designation signal is received at the antenna 26 and then sent through the multiplexer/distributer 25 to the receiver 23 which further applies the received speech channel designation signal to the controller 20. The controller 20, when receiving the speech channel designation signal (step 37), confirms that the identification code of the mobile unit in question is contained in the speech channel designation signal, and then informs the synthesizer 21 of the speech channel designated by the speech channel designation signal, whereby the transmitter 22 and the receiver 23 are set at the designated speech channel (step 38).

When the base and mobile units 3 and 5 are put in the communication state on the speech channel in this way, the mobile unit 5 is coupled through the base unit 3 to the wire line 2, thus enabling the issuance of a call to the public telephone network 1 shown in FIG. 1.

Accordingly, in the case where, for example, the mobile unit 5a is located in the service area 4a of the base unit 3a in FIG. 1 and the mobile unit 5a issues a call, the count value n is set at 0 so long as the base unit 3a is not used by another mobile unit, so that, if the count value n is set at 0, then the base unit 3a accepts a calling request from the mobile unit 5a and connects the mobile unit 5a to the wire line 2a. As a result, the calling operation of the mobile unit 5a through the base unit 3a to the wire line network 1 can be carried out.

In the case where the mobile unit 5b in the service area 4b is put in its communication state through the base unit 3b, for example, the base unit 3b sets the count value n at 1. In this case, when the mobile unit 5c located in another service area except for the service area 4b issues a calling request, since the base unit 5b sets the count value n not at 0 but at 1, the base unit 3b rejects the calling request from the mobile unit 5c.

Figure 4:
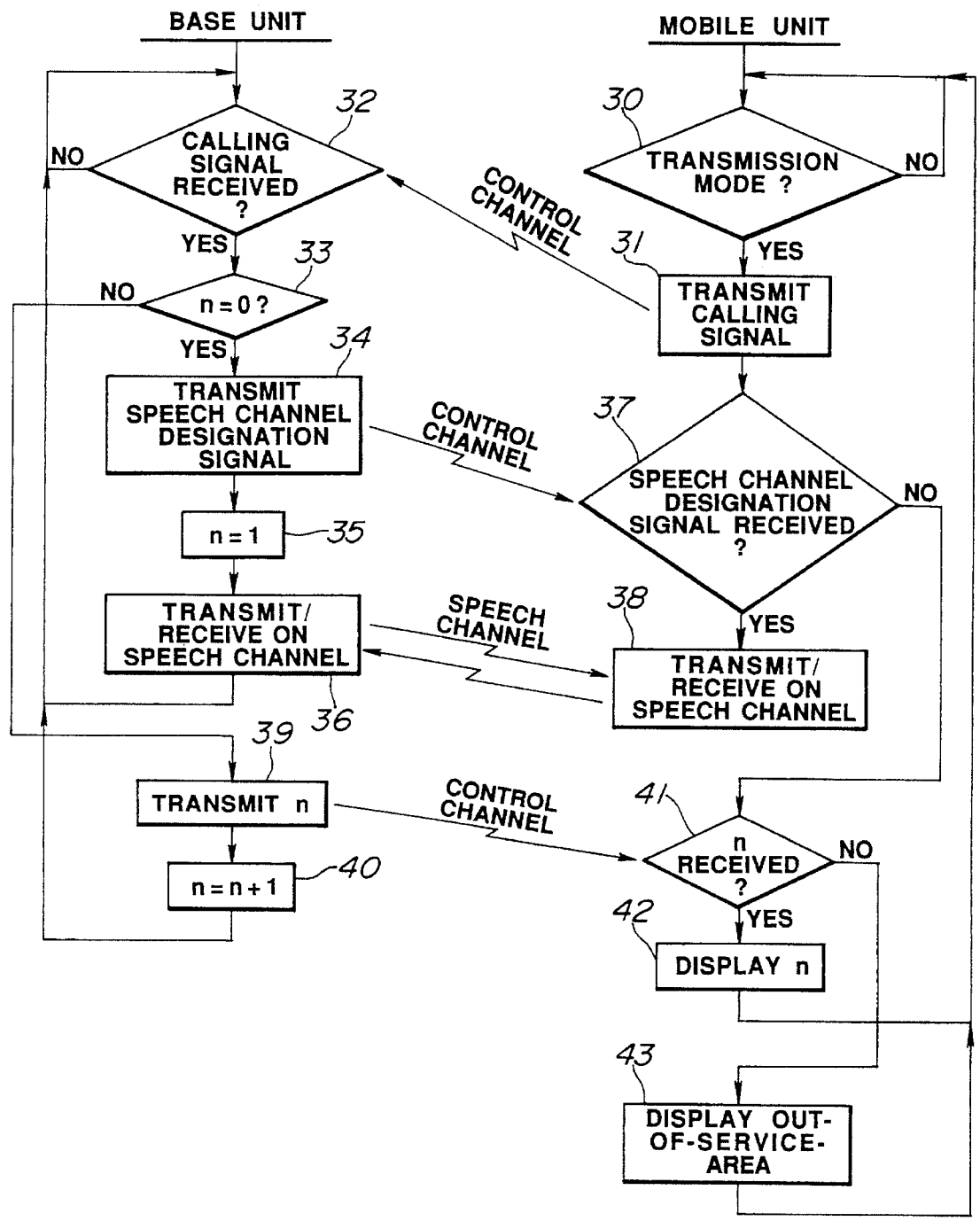
FIG. 4 is a flowchart showing the operation of the embodiment of FIG. 1.

That is, when the controller 17 of the base unit 3 determines at the step 33 in FIG. 4 that the count value n is not 0, control is transferred not to the processing of the step 34 but to the processing of a step 39. In the step 39, controller 17 applies to the control channel transmitter 18 the identification code of the mobile unit 5 and a calling rejection signal indicative of an index value 1 equal to the count value n of 1 to transmit the calling rejection signal on the control channel. Thereafter, controller 17 adds 1 to the count value of 11) to set the count value n at 2 (step 40).

The mobile unit 5, in the step 37, receives not the speech channel designation signal but the calling rejection signal at the receiver 23 and sends it to the controller 20. If the calling rejection signal designates the identification code of the mobile unit in question, then the controller 20 decides that the calling request was rejected and also that the calling rejection signal indicates an index value of 1 (step 41). And the controller 20 indicates the rejected calling request and the index value 1 on the display 29 (step 42) and returns to its wait state.

This enables the user to recognize the rejection of his calling request and the index value 1 and to know the then use of the base unit 5 by another mobile unit.

In the event where the mobile unit 5d located outside the service area 4b of the base unit 3b issues a calling request as shown in FIG. 1 for example, radio communication between the base unit 3b and the mobile unit 5d cannot be established.

For this reason, the mobile unit 5 does not receive the speech channel designation signal in the step 37 and also does not receive the calling rejection signal at the step 41, so that the controller 20 judges that the mobile unit is located outside the service area of the associated base unit and displays the effect of the mobile unit located outside the service area on the display 29 (step 43). Therefore, the user can know that he can never issue a call unless his mobile unit moves into the service area of the base unit.

Assume, for example, that the three mobile units 5g, 5h and 5i are located in the service area 4e of the base unit 3e, the mobile unit 5g is talking with the party through the base unit 3e, and also the two mobile units 5h and 5i sequentially issue their calling requests in FIG. 1. Then, the mobile unit 5h displays the rejection of his calling request and the index value 1 like the mobile unit 5c in the service area 4b to inform the user of the base unit being used by another mobile unit. Thereafter, the base unit 3e adds 1 to the count value of 11) to set the count value n at 2, transmits the calling rejection signal indicative of the index value 2 equal to the count value n (=2) in response to the calling request from the mobile unit 5i, and after transmitting the calling rejection signal, adds 1 to the count value n of 2 to set the count value n at 3. Thus, the mobile unit 5i, when receiving the calling rejection signal, displays the rejection of its calling request and the index value 2 to inform the user the base unit being used by another mobile unit and also of yet another mobile unit being awaiting the use of the base unit.

Accordingly, in the case where n of the mobile units are present in the service area of the associated base unit, one of these mobile unit is talking with the party through the base unit and other (n−1) mobile units sequentially issue their calling requests; the mobile unit which lastly issued its calling request displays thereon the index value (n−1), which informs the user of the other (n−1) mobile units than the lastly issued mobile unit (corresponding to the mobile unit being now using the base unit and the (n−2) mobile units waiting for the next use of the base unit).

Figure 5:
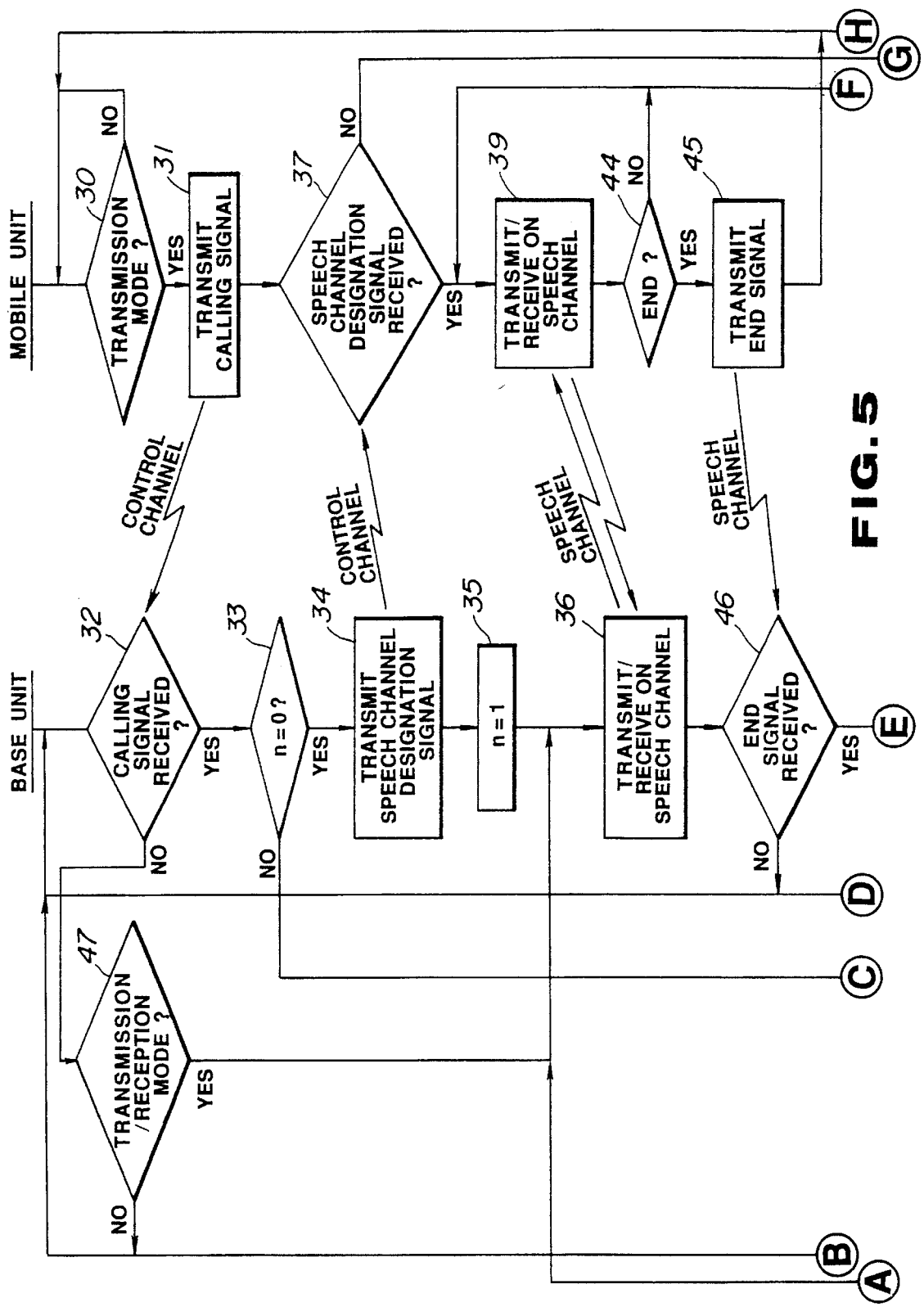
FIG. 5 is a flowchart showing the operation of a second embodiment of the present invention.

FIG. 5 shows a flowchart of the operation of a second embodiment of the present invention, corresponding to the operation of the base and mobile units shown in FIGS. 2 and 3. In the flowchart of FIG. 5, substantially the same steps in operation as those in the flowchart of FIG. 4 are denoted by the same reference numerals for convenience of explanation.

In the present embodiment of FIG. 5, the processing of the base unit 3a, when the base unit 3a are not used by any mobile unit and the mobile unit 5b in the service area 4a issues a call in FIG. 1, is substantially the same as that shown in FIG. 4, in which case the mobile unit 5b is put in its speech state through the base unit 3a.

When the speech of the mobile unit 5 is completed and the user thereof operates the operating part 28, this causes the mobile unit 5 to be put in the on-hook state so that the controller 20 judges the completion of the speech (step 44) and applies a speech end signal to the transmitter 22 on the basis of the judgement. This causes the mobile unit 5 to transmit the speech end signal on the speech channel (step 45) and to return to its wait state.

The controller 17 of the base unit 3, in the speech mode, is monitoring the reception of the speech end signal. The controller 17, when receiving the speech end signal (step 46), determines the completion of the speech. When the speech is stopped before the controller receives the speech end signal, the controller 17 detects the current state on the basis of an output from the speech channel receiver 15 (step 47) and returns to the wait state.

When the determination of the controller 17 is the completion of the speech in the step 46, the controller 17 once opens the DC loop of the wire line 2 and judges whether or not the count value n is larger than a value 1 (step 48). At this stage, if the base unit 3a shown in FIG. 1 is being used by the mobile unit 5a and any other mobile units issue no calling requests to the base unit 3a, then the controller 17 judges in the step 48 that the count value n is not larger than the value 1.

In this case, the controller 17 in the base unit 3 changes the count value n of 1 to a value 0 (step 49) to put the base unit 3 in the wait state.

In the event where the mobile unit 5b in the service area 4b in FIG. 1 is talking with the party through the base unit 3b and another mobile unit 5c issues a calling request to the base unit 3b, the following processing is carried out.

First, when the base unit 3 is being used for a speech and indicates the count value n of 1 therein, the controller 17 applies to the control channel transmitter 18 the calling rejection signal indicative of the identification code of the mobile unit 5 which issued the calling request and an index value 1 equal to the count value n of 1 to transmit the calling rejection signal (step 39). Thereafter, the controller 17 stores the identification code of the mobile unit 5 in the memory (not shown) incorporated therein at an identification code address corresponding to the index value 1 (step 50). And the controller 17 addes a value 1 to the count value n of 1 to set the count value n at a value 2 (step 40).

The mobile unit 5, meanwhile, receives the calling rejection signal and applies it to the controller 20 therein. The controller 20 confirms the identification code of the mobile unit included in the calling rejection signal and indicates on the display 29 the index value 1 designated by the calling rejection signal (steps 41 and 42). The controller 20 then monitors the reception of the speech channel designation signal transmitted from the base unit 3 (step 51).

When the speech of the mobile unit 5b in FIG. 1 is now completed, the base unit 3b receives the speech end signal from the mobile unit 5b, once opens the DC loop of the wire line 2 in response to the reception of the speech end signal, and then transmits the speech channel designation signal to the mobile unit 5c.

That is, the base unit 3 receives the speech end signal at the speech channel receiver 15 and applies it to the controller 17 (step 46). The controller 17, when receiving the speech end signal, judges whether or not the count value n indicated in the base unit 3 is larger than a value 1 (step 48). At this stage, since the count value n is set at a value 2 because the base unit 3 is being used, the controller 17 determines that the count value n is larger than the value 1. The controller 17 then reads out from the memory the identification code corresponding to the index value 1 previously stored therein in the step 50, and applies the speech channel designation signal including the identification code to the control channel transmitter 18 to transmit the speech channel designation signal on the control channel from the base unit 3 (step 53). And the controller 17 subtracts 1 from the count value n of 2 to change the count value n at, a value 1 (step 54). After this, the controller 17 monitors the reception of a response signal from the mobile unit 5 having the aforementioned identification code (step 55).

The mobile unit 5, on the other hand, receives the speech channel designation signal and applies it to the controller 20 (step 51). The controller 20, when receiving the speech channel designation signal, confirms the identification code of the mobile unit contained in the speech channel designation signal, in which case the controller 20 sets the transmitter 22 and the receiver 23 at the speech channel designated by the speech channel designation signal. The controller 20 then applies the response signal including the identification code to the transmitter 22 to transmit the response signal on the speech channel (step 52).

The base unit 3 receives the response signal at the speech channel receiver 15 and applies it to the controller 17 (step 55). The controller 17 judges whether or not the identification code included in the response signal coincides with that corresponding to the index value 1 stored in the memory. The judgement of an coincidence therebetween causes the controller 17 to erase the identification code from the memory together with the index value 1 and also to close the DC loop of the wire line 2 to get ready for the speech. When the base unit fails to receive the response signal at the step 55, the controller 17 regards the mobile unit 5 monitoring the reception of the speech channel designation signal as having moded outside the service area of the base unit in question and returns to the processing of the step 48.

In this way, when the base unit 3b receives a calling request from another mobile unit 5c during the speech of the mobile unit 5b, the base unit 3b stores in the memory the identification code of the mobile unit 5c and the associated index value 1 equal to the count value n of 1, transmits the calling rejection signal to the mobile unit 5c which issued the calling request, changes the count value n to a value 2 and then monitors the reception of the speech end signal transmitted from the mobile unit 5b in the speech mode. The base unit 3b, when receiving the speech end signal, transmits the speech channel designation signal to the mobile unit 5c having the identification code corresponding to the index value 1 previously stored in the memory becasue of the count value n greater than a valaue 1. Thereafter, the base unit 3b erases the identification code and the associated index value 1 from the memory and also changes the count value n of 2 to a value 1. The mobile 5c, after issuing the calling request and receiving the calling rejection signal from the base unit 3b, monitors the reception of the speech channel designation signal transmitted from the base unit 3b. And the mobile unit 5c, when receiving the speech channel designation signal, sets the speech channel designated by the speech channel designation signal and transmits the response signal to the base unit 3b. This results in that, when the speech of the mobile unit 5b is completed, the mobile unit 5c is coupled to the wire line 2 through the base unit 3b and put in the speech state.

In the case where the mobile unit 5g in the service area 4e in FIG. 1 is put in the speech mode and other mobile units 5h and 5i sequentially issue their calling requests, for example; the base unit 3e first responds to the calling request of the mobile unit 5h, stores in the memory the identification code sent from the mobile unit 5h together with the index value 1 equal to the count value n of 1, transmits the calling rejection signal to the mobile unit 5h, and then changes the count value n to a value 2. The base unit 3e further responds to the calling request from the mobile unit 5i, stores in the memory the identification code of the mobile unit 5i and the associated index value 2 equal to the count value n of 2, transmits ths calling rejection signal to the mobile unit 5i, and then changes the count value n to a value 3. Thereafter, the base unit 3e, when receiving the speech end signal from the mobile unit 5g, transmits the speech channel designation signal to the mobile unit 5h having the identification code corresponding to the index value 1 previously stored in the memory. The base unit 3e then erases the identification code of the mobile unit 5h and the index value 1 from the memory, substracts 1 from the index value 2 corresponding to the identification code of the mobile unit 5i to change the index from a value 2 to a value 1, and changes the count value n of 3 to a value 2. The mobile unit 5h, when receiving the speech channel designation signal from the base unit 3e, sets the speech channel, transmits the response signal to the base unit 3e and enters into the speech state. The base unit 3e, when receiving the speech end signal from the mobile unit 5h, transmits the speech channel designation signal to the mobile unit 5i having the identification code corresponding to the index value 1 previously stored in the memory. The base unit 3e then erases the identification code of the mobile unit 5i and the index value 1 from the memory and also changes the count value n of 2 to a value 1. The mobile unit 5i, when receiving the speech channel designation signal from the base unit 3e, sets the speech channel, transmits the response signal to the base unit 3e and then enters into the speech mode. After this, the base unit 3e, when receiving the speech end signal from the mobile unit 5i, changes the count value n of 1 to a value 0 and enters into the wait state.

In this way, in the event where n of the mobile units 5 are present in the service area of the base unit 3, one of these mobile units 5 is talking with the party through the base unit 3, and the other (n−1) mobile units 5 sequentially issue their calling requests; the base unit 3, each time it receives the calling request from the other (n−1) mobile units 5, stores the identification code of the associated mobile unit 5 together with associated one of the index values 1 to (n−1). The base unit 3, when receiving the speech end signal from the mobile unit 5 of the speech mode, transmits the speech channel designation signal to the mobile unit 5 having the identification code corresponding to the index value 1 to establish the speech of the mobile unit 5 of the inde value 1 and also erases the index value 1 together with the identification code of the same mobile unit 5 from the memory. The base unit 3 further subtracts 1 from the respective index values 2 to (n−1) corresponding to the (n−2) identification codes already stored in the memory to change them to the index values 1 to (n−1) corresponding to the (n−2) identification codes. As a result, the n mobile units 5 can be sequentially put in the speech mode in the calling-request issuance order.

The each mobile unit 5, when receiving the speech channel designation signal on the control channel and judging the absence of the identification code of the same mobile unit in the speech channel designation signal, subtracts the index value n indicated on the display 29 by 1. As a result, the user can know how many mobile units are waiting for the end of the speech before its own calling request is accepted at the base unit.

Figure 6:
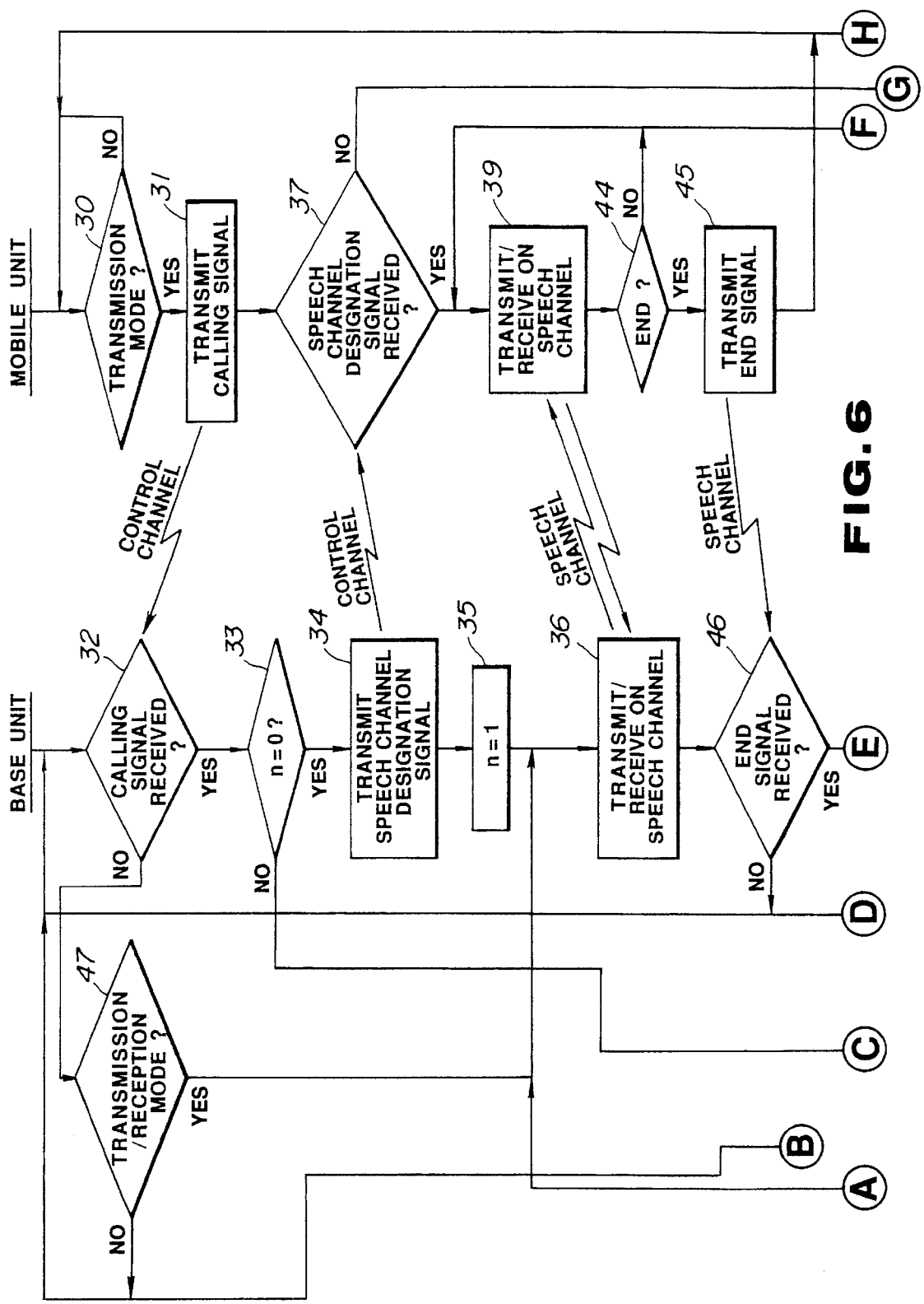
FIG. 6 is a flowchart showing the operation of a third embodiment of the present invention.

Referring to FIG. 6, there is shown a flowchart in accordance with a third embodiment of the present invention, which corresponds to the operation of the base and mobile units of FIGS. 2 and 3. In FIG. 6, steps having substantially the same processings as those in FIG. 5 are denoted by the same reference numerals for convenience of explanation.

The present embodiment is designed so that, when a calling request from the mobile unit 5 is not accepted at the base unit 3, the base unit does not store the identification code of the mobile unit 5 therein indiscriminately and stores it only when the mobile unit 5 instructs the base unit 3 to register its identification code.

More in detail, the base unit 3 in the speech mode, when receiving a calling request from the mobile unit 5 and determining that the count value n is not zero (step 33), applies a registration request signal containing the identification code of the mobile unit 5 to the control channel transmitter 18 and transmits it (step 56).

The mobile unit 5, though it issued the calling request, does not receive the speech channel designation signal from the base unit 3 (step 37) and instead receives the registration request signal on the control channel and applies it to the controller 20 (step 57). In response to this, the controller 20 indicates on the display 29 the effect of whether to register the identification code of the mobile unit in the base unit 3 (step 58). At this stage, when the user of the mobile unit operates the operating part 28 to instruct the mobile unit to register the identification code or not (step 59). If the user instructs the mobile unit not to register its own identification code, then the controller 20 controls the mobile unit to enter into the wait mode. When the user instructs the registration of the identification code, the controller 20 applies to the transmitter 22 a registration signal including its own identification code to transmit the registration signal on the control channel (step 60), after which control is transferred to a step 41. When the mobile unit 5 fails in the step 57 to receive the registration request signal from the base unit 3, the controller 20 regards the mobile unit 5 as located outside the service area of the base unit 3 and indicates the effect on the display 99 (step 43).

The base unit 3, after having transmitted the registration request signal, is monitoring the reception of the registration signal transmitted from the mobile unit 5 (in a monitor mode) (step 61) and, so long as the base unit 3 receives no registration signal, the base unit 3 keeps its monitor mode. When the base unit 3 receives the registration signal at the control channel receiver 19, the controller 17 of the base unit 3 receives the registrattion signal from the receiver 19 to move to the processing of the next step 39.

Accordingly, so long as the base unit 3 receives no registration signal from the mobile unit 5, the base unit never transmits the calling rejection signal indicative of the index value equal to the count value n based on the step 39 and thus never stores the identification code of the mobile unit 5 and the associated index value based on the step 50. This means that the base unit 3 regards the mobile unit as not waiting for his speech turn. The mobile unit 5, on the other hand, will not receive the calling rejection signal and thus will not indicate such an index value as to inform the user of his speech turn number before the acceptance of the calling request.

In this manner, since the base unit can register the identification code of the mobile unit 5 only when the user of the unit 5 instructs the base unit to register its identification code, the user can select whether to await his speech turn.

In this manner, since the base unit can register the identification code of the mobile unit 5 only when the user of the unit 5 instructs the base unit to register its identification code, the user can select whether to await his speech turn.

Figure 7:
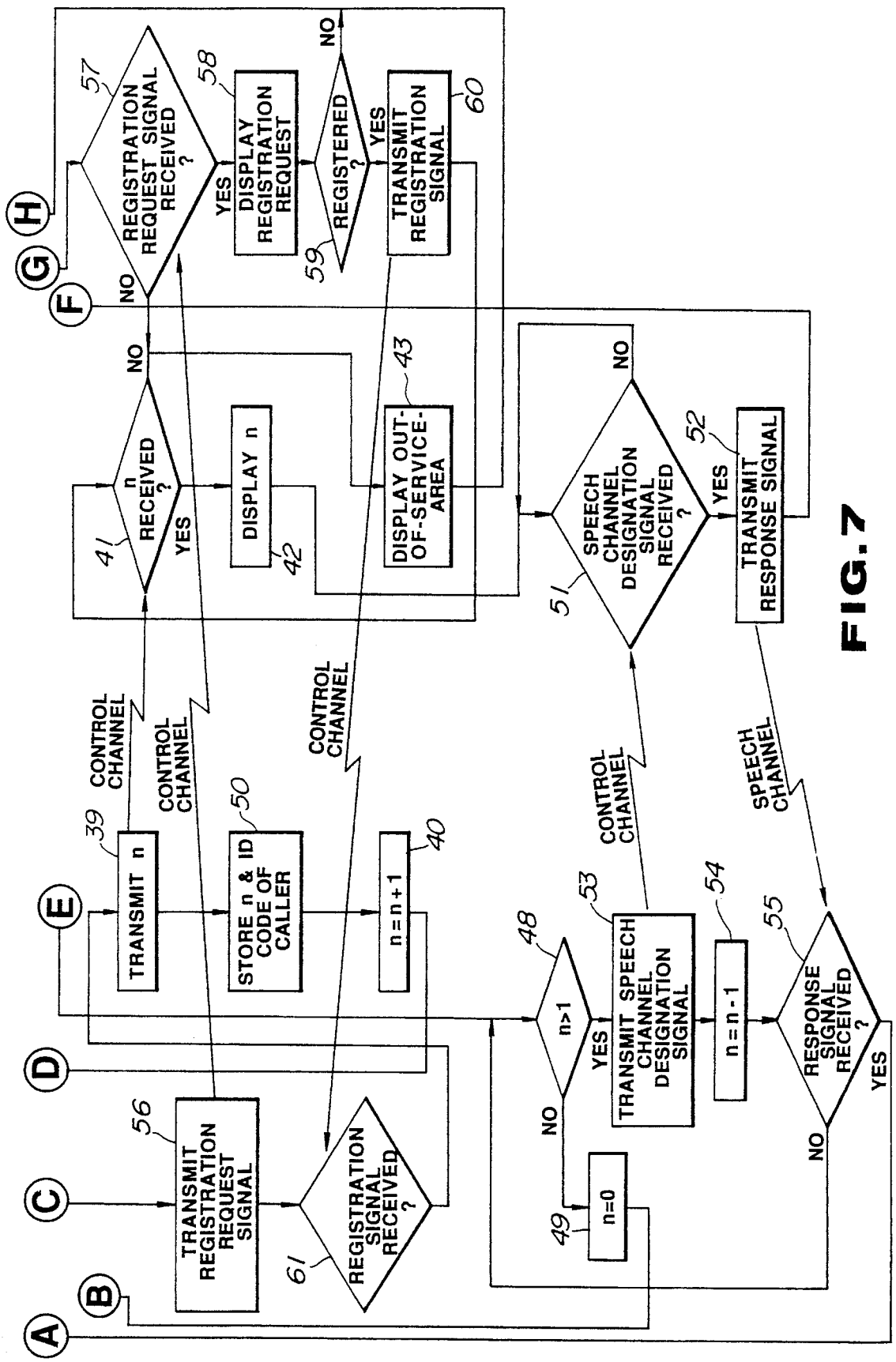
FIG. 7 is a flowchart showing the operation of a fourth embodiment of the present invention.

There is shown in FIG. 7 a flowchart in accordance with a fourth embodiment of the present invention, which corresponds to a different example of the operation of the base and mobile units of FIGS. 2 and 3. In FIG. 7, steps having substantially the same processings as those in FIG. 6 are denoted by the same reference numerals for convenience of explanation.

The present invention is designed so that, for example, when two or more mobile units are waiting for their turn to use the base unit 3, that is, when the count value n of the base unit 3 is 3 or more, the base unit 3 issues a warning to the talking mobile unit 5 to quickly terminate the speech.

More specifically, when the base unit 3 determines in the step 47 that the speech is continued, the controller 17 of the base unit judges whether or not the count value n is larger than a preset threshold value m of, for example, 3 (step 62). When the controller 17 determines that the the count value n does not exceed the threshold value m of 3, that is, when the number of mobile units waiting for its turn to use the base unit is 1 or 0, the the base unit 3 moves to the processing of the next step 36. When the controller 17 determines in the step 62 that the count value n is the threshold value of 3 or more, that is, when two or more mobile units are waiting for their turn to use the base unit, the controller 17 starts the measurement of elapsed time of a preset time $T_1$, (step 63) and moves to the next step 36. When detecting the expiration of elapsed time of the time $T_1$, during continuation of the speech (step 63), the controller 17 applies an alarming tone signal to the speech channel transmitter 12 so that the alarming tone signal is multiplexed on a speech voice signal and then transmitted to the mobile unit 5 still in the speech mode (step 64).

The mobile unit 5 receives the alarming tone signal togeher with the speech voice signal at the receiver 23 and the both signals are sent to the handset receiver 27. Accordingly, the user of the mobile unit can hear the alarming tone during his speech and can know that he is warned to terminate the speech as quickly as possible.

In the case where the transmission of the alarming tone signal from the base unit 3 to the mobile unit 5 results in the continuation of the speech at the mobile unit, the controller 17 repeats the processings of the steps 47, 62, 63 and 64. That is, the alarming tone signal is transmitted at intervals of the time $T_1$. In other words, in the event where two or more mobile units are waiting for their turn to use the base unit but the mobile unit is still talking with the party through the base unit, the user of the mobile unit in question can hear the alarming tone at intervals of the time $T_1$. May be used as the alarming tone an intermittent or continuous buzzer tone or the like. Further, the alarming may be made more effective by setting the alarming-tone-signal transmission interval or time $T_1$, to be gradually shorter or by setting the pitch of the alarming tone to be gradually higher as the speech continuation time becomes longer. In addition, the controller 17 may be designed so that, when the transmission of the alarming tone signal is carried out at intervals of the time $T_1$, for example, 5 times or more, the controller opens the DC loop of the wire line 2 to forcingly cut off the speech.

Figure 8:
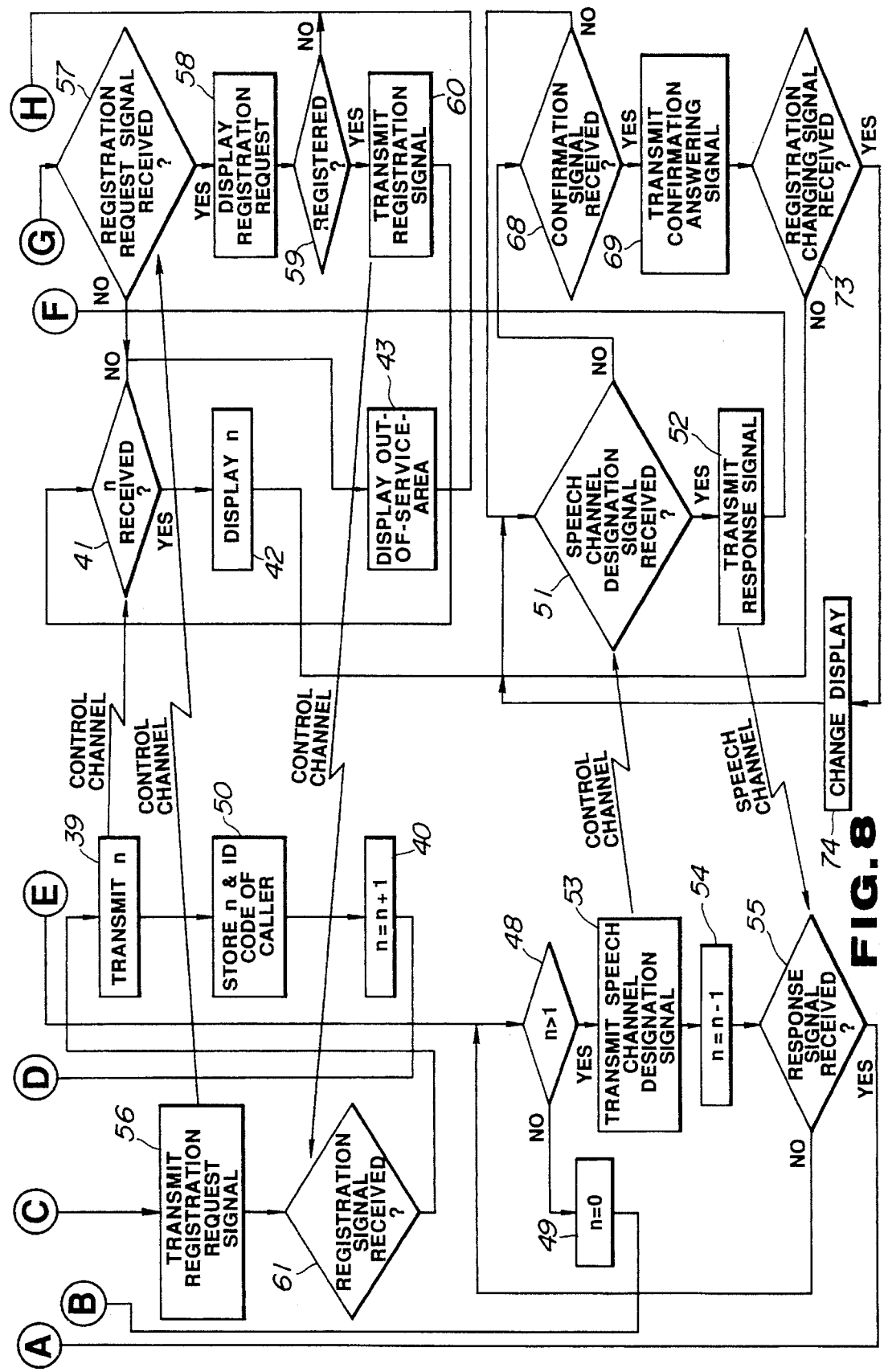
FIG. 8 is a flowchart showing the operation of a fifth embodiment of the present invention.

Shown in FIG. 8 is a flowchart of a fifth embodiment of the present invention which corresponds to the operation of the base and mobile units of FIGS. 2 and 3. In FIG. 8, steps having substantially the same processings as those in FIG. 7 are denoted by the same reference numerals for convenience of explanation.

The present embodiment is so designed that, the base unit 3 is being used and the mobile unit 5 subjected to the rejection of its calling request to the base unit registers its identification code in the base unit, the base unit 3 checks whether the cell origination mobile unit 5 is located in the service area of the base unit or moved outside the service area.

More in detail, when the base unit 3 determines in the step 47 that the speech is continued, the controller 17 judges whether or not the count value n is larger than a value 1 (step 65). If the controller 17 determines the count value n not exceeding 1, or in other words, if there is no mobile unit which is waiting for its turn to use the base unit, then the controller 17 moves to the processing of the next step 36. When the controller 17 determines in the step 65 that the count value n is greater than the value 1, or in other words, when any mobile unit or units are waiting for their turn to use the base unit, the controller 17 starts the measurement of passage of a preset time $T_2$, (step 66) and goes to the processing of the next step 36. When detecting the expiration of the time $T_2$ during continuation of the speech (step 66), the controller 17 reads out from the memory incorporated therein the identification code of the mobile unit 5 waiting for the next use of the base unit and applies a confirmation signal including the read identification code to the control channel transmitter 18 to transmit the confirmation signal (step 67).

The mobile unit 5, after subjected to the rejection of its calling request, issues a registration request of its identification code to the base unit 3 and thereafter monitors the reception of the speech channel designation signal from the base unit 3 and also monitors the reception of the confirmaton signal (steps 51 and 68). When the mobile unit 5 receives the confirmation signal in place of the reception of the speech channel designation signal, the controller 20 receives the confirmation signal and checks whether or not the identification code of the mobile unit is included in the confirmation signal. The determination of the identification code included in the confirmation signal causes the controller 20 to send a confirmation answering signal including the identification code to the transmitter 22 to transmit the confirmation answering signal therefrom on the control channel (step 69).

The base unit 3 receives the confirmation answering signal, sends it to the controller 17. The controller 17 in turn checks whether or not the identification code of the call origination mobile unit is included in the confirmation answering signal (step 70), and if the identification is included, the controller 17 goes to the processing of the step 36.

Assume now that the mobile unit 5g in the service area 4e is talking with the party in FIG. 1, the base unit 3 stores in its memory the identification code of the mobile unit 5h and the index value 1 and also stores the identification code of the mobile unit 5i and the index value 2. Then the base unit 3 sequentially issues a confirmation signal including the identification code corresponding to the index value 1 as well as a confirmation signal including the identification code corresponding to the index value 2 (step 67). Accordingly, the base unit 3 receives confirmation answering signals from the mobile units 5h and 5i (step 70). When receiving the both confirmation answering signals, the base unit goes to the processing of the next step 36.

In the case where the mobile unit 5h moves outside the service area 4e during continuation of the speech of the mobile unit 5g, even when the base unit 3 receives the confirmation answering signal from the mobile unit 5i, the base unit will not receive the confirmation answering signal from the mobile unit 5h located outside the service area 4e.

In this case, the base unit 3 receives the confirmation answering signal including the identification code corresponding to the index value 2 but fails to receive the confirmation answering signal including the identification code corresponding to the index value 1 (step 70). Thus the controller 17 judges that the mobile unit having the identification code corresponding to the index value 1 was moved outside the service area and then goes to the next step 71. In the step 71, the controller 17 erases the index value 1 already stored in the memory built therein and the identification code corresponding to the index value 1 and also subtracts 1 from the index value 2. The controller 17 also subtracts 1 from the count value n of 3 to set the count value n at a value 2.

Accordingly, the base unit 3e regards only one mobile unit as waiting for its turn to use the base unit and therefore stores therein the identification code of the mobile unit 5i together with the index value 1 and the count value n of 2.

Thereafter, the controller 17 of the base unit 3 supplies a registration changing signal indicative of the index value 1 to the control channel transmitter 18 to transmit the registration changing signal (step 72). In this connection, the registration changing signal contains the identification code corresponding to the index value 1.

The mobile unit 5 receives the registration changing signal and applies it to the controller 20 (step 73). The controller 20 in turn, when confirming the presence of the identification code of the mobile unit 5 in the received registration changing signal, indicates on the display 29 the index value 1 indicated by the registration changing signal in place of the index value 2 so far displayed until the reception of the registration changing signal (step 74).

This causes the index value displayed on the mobile unit 5i to be changed from a value 2 to a value 1, whereby the user can know that the order of waiting for his turn to use the base unit 3e was advanced by 1.

In this way, in the event where n of the mobile units 5 are located in the service area of the base unit 3, one of these mobile units 5 is talking with the party through the base unit 3 and the base unit 3 registers the identification codes of the other (n−1) mobile units 5 and the associated index values; the base unit 3 issues the confirmation signal to the other (n−1) mobile units 5. If the mobile unit 5 having the identification code corresponding to the index value 1 is shifted outside the service area, then the base unit 3 cannot receive the confirmation answering signal from the shifted mobile unit 5 and can receive the confirmation answering signals only from the mobile units 5 having the identification codes corresponding to the index values 2 to (n−1). For this reason, the base unit 3 erases the registration of the index value 1 and the identification code corresponding to the index value 1 and also subtracts 1 from the respective index values 2 to (n−1) to change them to the index values 1 to (n−2). And the base unit 3 transmits registration changing signals indicative of the changed index values 1 to (n−2) to the (n−2) mobile units 5 which issued their confirmation answering signals to the base unit. As a result, the (n−2) mobile units 5 which issued their confirmation answering signals to the base unit change the indication of their index values from the index values 2 to (n−1) to the index values 1 to (n−2), whereby the respective users can know the order of awaiting the use of the base unit was advanced by 1 respectively. Such processing is repeated at intervals of the time $T_2$.

Figure 9:
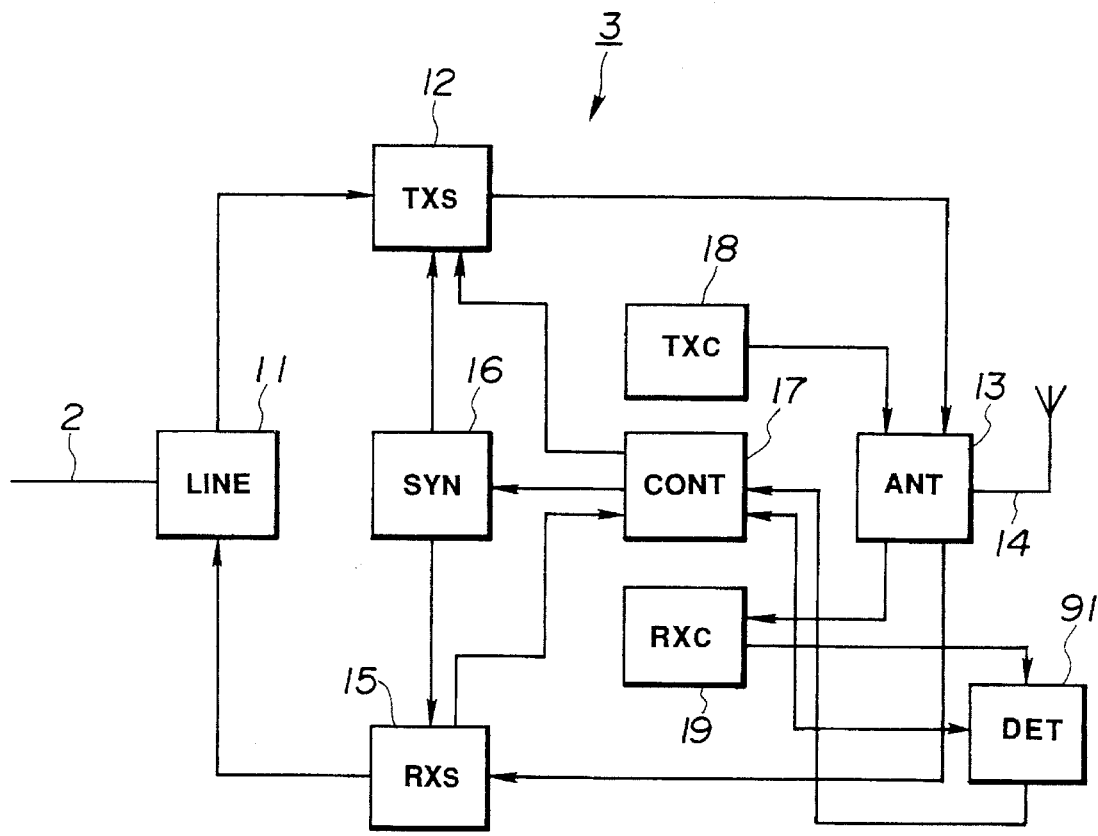
FIG. 9 is a block diagram of a base unit used in a sixth embodiment of the present invention.
Figure 10:
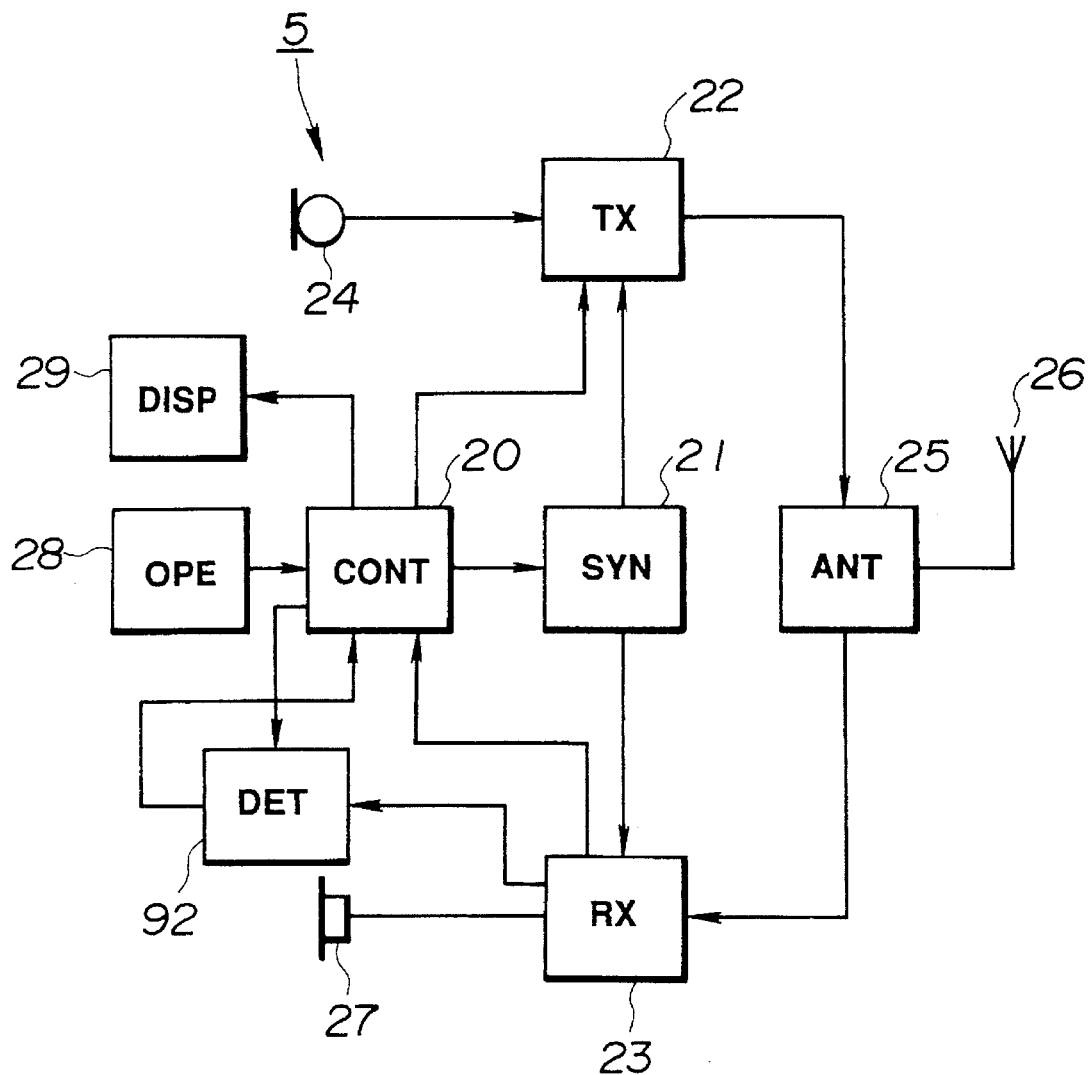
FIG. 10 is a block diagram of a mobile unit used in the sixth embodiment of the present invention.
Figure 11:
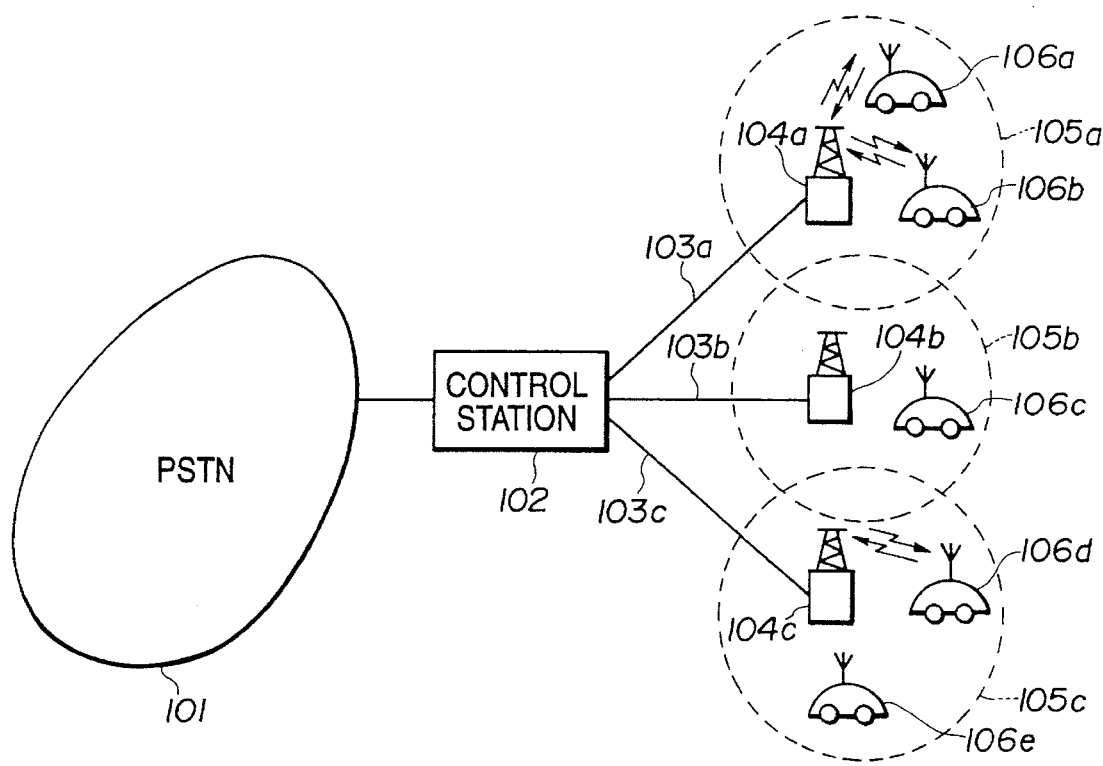
FIG. 11 schematically shows an arrangement of an ordinary car telephone system.

FIGS. 9 and 10 show, respectively in a block diagram form, the arrangements of the base and mobile units 3 and 5 employed in a sixth embodiment of the present invention. In these drawings, parts having substantially the same functions as those in FIGS. 2 and 3 are denoted by the same reference numerals for convenience of explanation.

In FIG. 9, the base unit 3 includes an electric-field-intensity judging circuit 91 which detects the intensity of a received electric field on the basis of the output of the control channel receiver 19 and when the received field intensity is less than, for example, 10 dBμV, which supplies a detection signal indicative of the effect to the controller 17. Accordingly, when the base unit receives electromagnetic waves from the mobile unit 5 and the intensity of the received field is less than 10dBμV, the controller 17 receives the detection signal from the field-intensity judging circuit 91.

The mobile unit 5 of FIG. 10 includes an electric-field-intensity judging circuit 92 which detects the intensity of a received electric field on the basis of the output of the control channel receiver 23 and when the received field intensity is less than, for example, 20 dBμV, which supplies a detection signal indicative of the effect to the controller 20. Accordingly, when the mobile unit receives electromagnetic waves from the base unit 3 and the intensity of the received field is less than 20 dBμV, the controller 20 receives the detection signal from the field-intensity judging circuit 92.

In the case where the base unit 3 is to transmit the registration request signal in the step 56 of FIG. 6 and the controller 17 receives in the step 32 a calling signal from the mobile unit 5 as the receiver of the registration request signal, when the controller 17 receives from the received-field-intensity judging circuit 91 a detection signal indicative of the intensity of the received electric field of the calling signal less than 10 dBμV, the base unit 3 stops the transmission of the registration request signal in the step 56. That is, when the base unit 3 receives electromagnetic waves corresponding to the intensity of the received electric field less than 10 dBμV from the mobile unit 5, the base unit 3 will not transmit the registration request signal.

In the case where the mobile unit 5 is to transmit the registration signal in the step 60 of FIG. 6 and the controller 20 receives in the step 57 a registration request signal from the base unit 3, when the controller 20 receives from the received-field-intensity judging circuit 92 a detection signal indicative of the intensity of the received electric field of the registration request signal less than 20 dBμV, the mobile unit 5 stops the transmission of the registration signal in the step 60. That is, when the mobile unit 5 receives electromagnetic waves corresponding to the intensity of the received electric field less than 20 dBμV from the base unit 3, the base unit 3 will not transmit the registration signal.

Thus, when the intensity of electric field received at the base unit 3 is less than 10 dBμV or the intensity of electric field received at the mobile unit 5 is less than 20 dBμV, the base unit 3 will not register the identification code of the mobile unit. Accordingly, the base unit 3 will not transmit the speech channel designation signal to the mobile unit unless the base unit 3 again receives a calling request from the mobile unit.

In this way, in the case where either one of the intensities of electric fields received at the base and mobile units 3 and 5 is too low, even when the received field intensity is at a speech enable level at the time of registering the identification code, the received field intensity is further reduced to a speech disable level due to the movement of an object or objects disposed around the units or due to a slight movement of the mobile unit 5. To avoid this, the present embodiment is designed so that the base unit 3 does not register the identifiction code of the mobile unit 5.

Although the foregoing embodiments have employed a multi-channel access system based on a single control channel and a plurality of speech channels, the present invention is not limited to the particular embodiments but may employ such a multi-channel access system that uses a plurality of speech channels and uses idle one of the speech channels as a control channel. Further, not only the control and voice signals may be transmitted on a frequency division basis but the both signals may also be converted to digital, signals, multiplexed on a time division basis (TDMA) and digitally transmitted.

A plurality of wire lines may be connected to a single base unit, in which case, when a set of speech channel transmitters and a set of speech channel receivers may be allocated to each of the wire lines to realize communication between the plurality of sets of transmitters and receivers and a plurality of mobile units on the time-division multiplex basis (TDMA), radio frequencies can be efficiently used.

In addition, the mobile unit may indicate not only the index value but also other data. For example, when a restriction time is set for one speech or call, a product of the restirction time and the index value corresponds to the maximum waiting time of the mobile unit having the index value and thus the maximum waiting time may be displayed together with the index value.

What is claimed:

1. A radio communication system comprising:

a plurality of mobile units that are movable to any place, the mobile units having respective identification data; and a base unit fixedly installed at a predetermined installation place, having a predetermined radio communication service area in the vicinity of the installation place and being connectable to a public telephone network through at least one public telephone line, the base unit being connectable through a radio channel to any one of the plurality of mobile units, wherein the mobile units are connected via a radio channel to the base unit by issuing a calling request to the base unit within the radio communication service area of the base unit so as to communicate with the public telephone network through the public telephone line, wherein the base unit comprises:

calling request receiving means for receiving a calling request when the calling request is issued from one of the mobile units within the radio communication service area of the base unit; and connection control means for receiving a calling request when the calling request is issued from one of the mobile units within the radio communication service area of the base unit, the connection control means including registering means for, when said at least one public telephone line is idle, connecting said one mobile unit, which issued the calling request, to the public telephone network through the idle public telephone line, and for, when said at least one public telephone line is busy, registering identification data of said one mobile unit, which issued the calling request, as a mobile unit in a calling request wait state in the registering means and for transmitting wait data indicative of the wait state of calling request by said one mobile unit, and wherein each of the mobile units comprises:

calling request transmitting means for transmitting a calling request to the base unit using a calling operation;

registration changing means for transmitting a registration confirming signal to mobile units registered in the registering means and, when a response signal to the registration confirming signal is not issued from one of the registered mobile units, erasing the registration of the one registered mobile unit which does not issue the response signal;

means for transmitting a changed registration signal indicative of a new registration content as changed by the registration changing means;

display means for displaying the wait state of calling requests upon receipt of the wait data from the base unit; and display control means for displaying the changed registration content on the display in response to the reception of the changed registration signal, wherein the connection control means responds to the registering means to establish a connection from a waiting mobile unit through the one public telephone line connected to the base unit, when the one public telephone line becomes idle upon disconnection of the one mobile unit through the base unit, and wherein the wait data comprises numerical data, and the registration changing means subtracts one from the numerical data when erasing the registration of the one registered mobile unit, the changed registration signal transmitting means transmits the numerical data subtracted by one.

2. The radio communication system as set forth in claim 1, wherein the wait data comprises numerical data, and wherein the connection control means sets the numerical data to zero in the idle state of the one public telephone line and increases the numerical data by one for each additional line connection request issued from the one mobile unit to the base unit in the busy state of the one public telephone line, and the display means of the one mobile unit displays the numerical data as set by the connection control means.

3. The radio communication system as set forth in claim 1, wherein the display means of one other mobile unit displays, after a public telephone line connection request has been made and when no wait data is received in the one other mobile unit, information indicating that the one other mobile unit is out of the radio communication service area of the base unit.

4. The radio communication system as set forth in claim 1, wherein the registering means registers wire line connection requests from mobile units in the busy state of the one public telephone line in order of arrival of the calling requests.

5. The radio communication system as set forth in claim 1, wherein the wait data comprises numerical data, and wherein:

the connection control means sets the numerical data to zero in the idle state of the one public telephone line and increases the numerical data by one for each public telephone line connection request issued in the busy state of the one public telephone line;

the mobile unit display means displays the numerical data;

the registering means registers the numerical data including the time when such wire line connection request is issued in the busy state of the one public telephone line together with identification data of the mobile unit that issues each public telephone line connection request; and the connection control means reduces the numerical data by one each time a mobile unit is disconnected from the one public telephone line.

6. The radio communication system as set forth in claim 1, wherein the display means of one other mobile unit displays, after a public telephone line connection request has been made and when no wait data is received in the one other mobile unit, information indicating that the one other mobile unit is out of the radio communication service area of the base unit.

7. The radio communication system as set forth in claim 1, wherein, when a new public telephone line connection request is issued in the busy state of the one public telephone line, the registering means registers a new mobile unit issuing the new public telephone line connection request if a registering signal is received from the new mobile unit in response to a registering request signal transmitted thereto from the base unit.

8. The radio communication system as set forth in claim 1, wherein the base unit comprises means, when the number of the mobile units registered in the registering means exceeds a predetermined number, for transmitting an information signal superimposed on a voice signal to a new mobile unit from which a new public telephone line connection request was received, and each mobile unit includes means for generating sound information in response to reception of the information signal.

9. The radio communication system as set forth in claims 1, wherein the information signal transmitting means transmits the information signal after a predetermined time from a time when the number of the mobile units registered in the registering means reaches the predetermined number, and thereafter repeats transmission of the information signal.

10. The radio communication system as set forth in claim 1, wherein the base unit transmits the registration confirming signal at predetermined time intervals.

11. The radio communication system as set forth in claim 1, further comprising:

detection means for detecting electric field strength received by at least one of the base unit and a requesting mobile unit issuing a public telephone line connection request; and inhibiting means, when the received electric field strength detected by the detecting means is lower than a predetermined identification level, for inhibiting the registration of the requesting mobile unit in the registering means.

* * * * *